(12) United States Patent
Petry-Johnson et al.

(10) Patent No.: US 8,695,455 B2
(45) Date of Patent: Apr. 15, 2014

(54) TRANSMISSION SYSTEM AND ASSOCIATED ENGINE

(75) Inventors: Travis T. Petry-Johnson, Peoria, IL (US); Franklin J. Struwe, East Peoria, IL (US); Michael P. Harmon, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 573 days.

(21) Appl. No.: 12/973,082

(22) Filed: Dec. 20, 2010

(65) Prior Publication Data
US 2012/0152048 A1 Jun. 21, 2012

(51) Int. Cl.
*F02B 67/04* (2006.01)

(52) U.S. Cl.
USPC .............. 74/572.2; 123/90.31; 403/359.5

(58) Field of Classification Search
USPC ................ 74/412 R, 572.2; 123/90.31; 403/359.1–359.6
See application file for complete search history.

(56) References Cited

U.S. PATENT DOCUMENTS

| 4,668,116 A | 5/1987 | Ito |
| 5,816,968 A | 10/1998 | Watson |
| 5,975,271 A * | 11/1999 | Iwata .................... 192/200 |
| 7,104,377 B2 * | 9/2006 | Cho et al. ............. 192/70.14 |

FOREIGN PATENT DOCUMENTS

| DE | 4128432 | 3/1993 |
| GB | 685426 | 1/1953 |
| JP | 2003083078 | 3/2003 |
| RU | 2 193 095 | * 11/2002 |

* cited by examiner

Primary Examiner — William C Joyce

(57) ABSTRACT

A transmission system includes a crankshaft having an outer surface with a plurality of splines and a hub having an inner surface with a plurality of splines. The hub is mounted on the crankshaft such that the plurality of splines on the inner surface of the hub meshes with the plurality of splines on the outer surface of the crankshaft. The transmission system further includes a flywheel mounted to the hub.

11 Claims, 2 Drawing Sheets

TRANSMISSION SYSTEM AND ASSOCIATED ENGINE

TECHNICAL FIELD

The transmission system and associated engine disclosed herein generally relate to configurations for integrating flywheels and gears with crankshafts on engines.

BACKGROUND

Transmission systems on engines present multiple design challenges, including the cost, complexity, and physical space associated with their implementation. Design simplification while maintaining desired power output is desirable. Multiple aspects of engine transmission systems present these challenges, but one such aspect is the interface between the flywheel and the crankshaft. This interface is addressed in U.S. Pat. No. 4,668,116 to Ito, which discloses a connection between a flywheel to a crankshaft. The flywheel and the crankshaft in Ito mesh directly with one another with teeth. Ito further discloses a connecting structure including a hub integral to the flywheel as well as a cup, cup-shaped structure, truncated conical structure, or similar connecting member engaging the hub of the flywheel to eliminate play between the flywheel and the crankshaft that occurs under conditions of torque fluctuation due to clearance between the meshing teeth.

SUMMARY

A transmission system disclosed herein includes a crankshaft having an outer surface with a plurality of splines and a hub having an inner surface with a plurality of splines. The hub is mounted on the crankshaft such that the plurality of splines on the inner surface of the hub mesh with the plurality of splines on the outer surface of the crankshaft. The transmission system further includes a flywheel mounted to the hub.

A transmission system disclosed herein includes a crankshaft having an outer surface with a plurality of splines and a crank gear having an inner surface with a plurality of splines. The plurality of splines on the inner surface of the crank gear are meshed with the plurality of splines on the outer surface of the crankshaft. The transmission system further includes a hub having an inner surface with a plurality of splines. The hub is mounted on the crankshaft such that the plurality of splines on the inner surface of the hub mesh with the plurality of splines on the outer surface of the crankshaft. The transmission system further includes a flywheel mounted to the hub. The hub is oriented between the crank gear and the flywheel.

An engine disclosed herein includes an engine block and a transmission system associated with the engine block. The transmission system includes a crankshaft having an outer surface with a plurality of splines and a crank gear having an inner surface with a plurality of splines. The plurality of splines on the inner surface of the crank gear are meshed with the plurality of splines on the outer surface of the crankshaft. The transmission system further includes a hub having an inner surface with a plurality of splines. The hub is mounted on the crankshaft such that the plurality of splines on the inner surface of the hub mesh with the plurality of splines on the outer surface of the crankshaft. The transmission system further includes a flywheel mounted to the hub. The hub is oriented between the crank gear and the flywheel.

DETAILED DESCRIPTION

Figure 1:
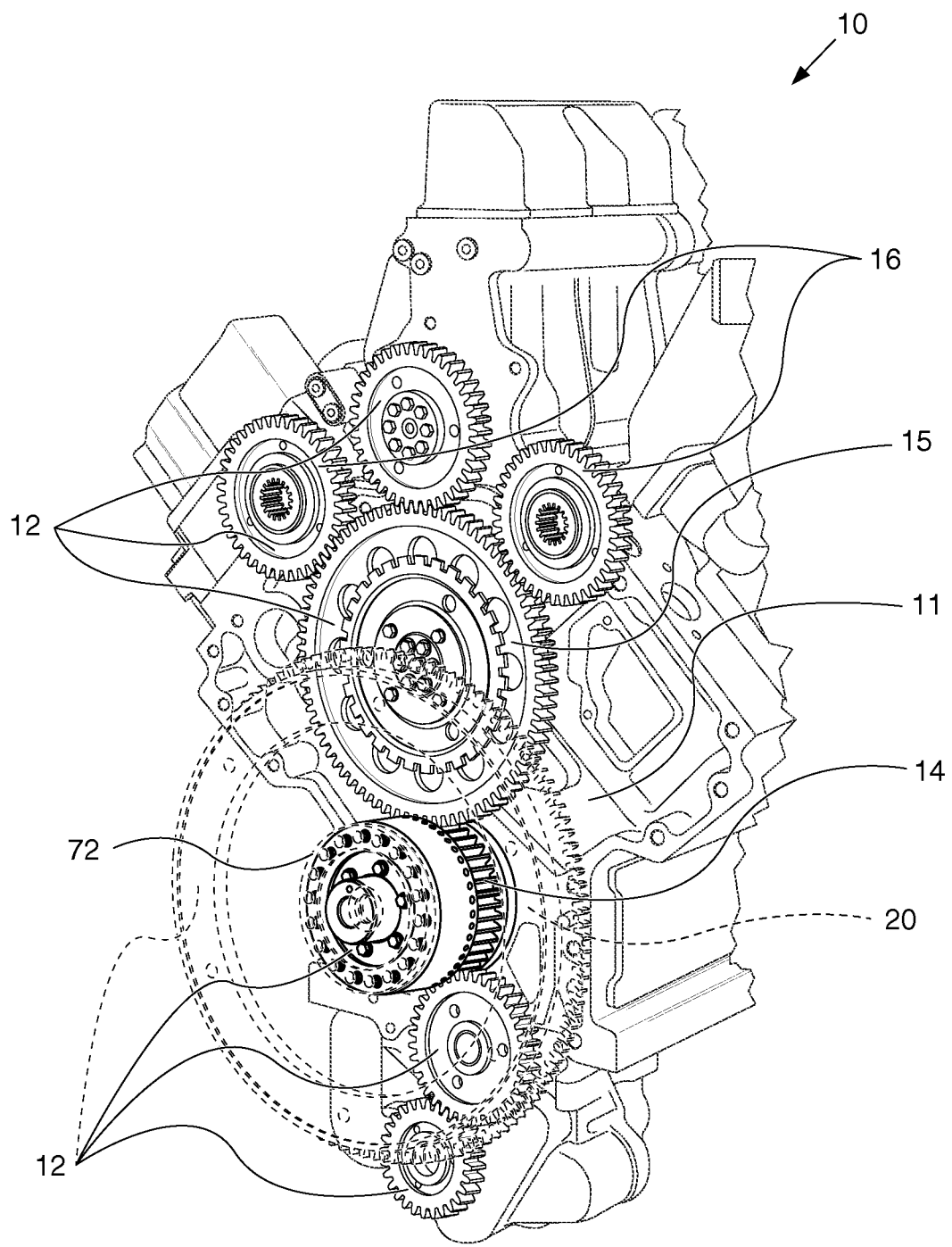
FIG. 1 is a fragmentary perspective view of a transmission system and associated engine according to an embodiment of the invention.
Figure 2:
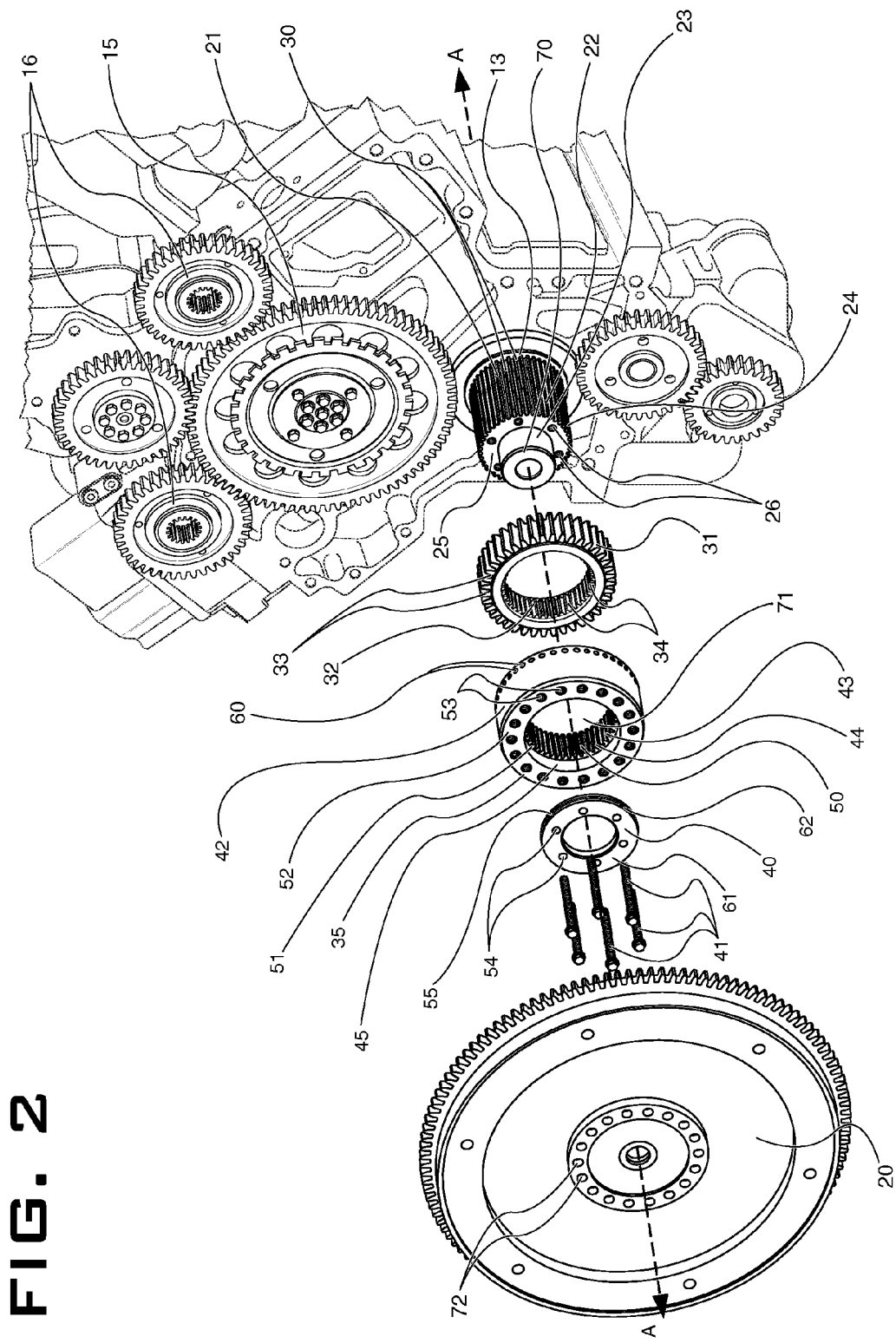
FIG. 2 is a fragmentary perspective view of the transmission system and associated engine shown in FIG. 1 with an exploded view of a portion of the transmission system.

An engine is shown broadly at reference numeral 10 in FIGS. 1 and 2. The engine 10 includes an engine block 11 and transmission system 12 outside the engine block 11. The transmission system 12 includes a crankshaft 13 (FIG. 2), a crank gear 14, a cam gear 15, and a flywheel 20. The transmission system 12 optionally includes a plurality of power takeoff gears 16 designed to interface with multiple components or systems (not shown) external to the engine 10 in order to power such components or systems. As one of ordinary skill would recognize, a plurality of gear housings (not shown) are mounted on the engine block 11, for instance to house the gears 14, 15, 16 and the flywheel 20.

The crankshaft 12 defines a longitudinal axis "A" (FIG. 2) and includes an external portion 21 extending out of the engine block 11. The external portion 21 of the crankshaft 12 includes a major stub 22 and a minor stub 23 attached to or integral with the major stub 22. The major stub 22 has an annular periphery 24 and an end surface 25. The annular periphery 24 of the major stub 22 includes a plurality of external splines 30, each in substantially parallel relation with the longitudinal axis "A" of the crankshaft 12. The end surface 25 of the major stub 22 is oriented in substantially perpendicular relation to the longitudinal axis "A" and defines a plurality of bolt holes 26. The minor stub 23 includes a chamfer 70 for assisting with mounting the flywheel 20 on the crankshaft 12.

The crank gear 14 includes an annular outer surface 31 and an annular inner surface 32. The annular outer surface 31 includes a plurality of teeth 33 configured to mesh with the cam gear 15 while the annular inner surface 32 includes a plurality of internal splines 34 configured to mesh with the plurality of external splines 30 on the major stub 22 of the crankshaft 12.

The flywheel 20 is mounted to the crankshaft 12 using a hub 35, a retention plate 40, and a plurality of bolts 41. The hub 35 defines a central opening 71 and includes an annular outer surface 42 and an annular inner surface 43. The annular outer surface 42 of the hub 35 defines a plurality of ports 60. As the crankshaft 12 rotates during operation of the engine 60, a sensor (not shown) proximal to the ports 60 detects movement of the ports 60 in order to assist with computing engine speed and fuel injection timing. The annular inner surface 43 of the hub 35 includes a splined portion 44 in proximal relation to the engine block 11 and a substantially smooth portion 45 in distal relation to the engine block 11. The splined portion 44 includes a plurality of internal splines 50 configured to mesh with the plurality of external splines 30 on the major hub 22 of the crankshaft 12. The splined and smooth portions 44, 45 of the annular inner surface 43 of the hub 35 intersect to form a shoulder 51 facing away from the crankshaft 12. The hub 35 further includes an end surface 52 facing away from the crankshaft 12 and oriented in substantially perpendicular relation to the longitudinal axis "A" and defining a plurality of bolt holes 53. The retention plate 40 includes an outer surface 61, an inner surface (not shown) opposite the outer surface 61, and an edge surface 62. Further, the retention plate 40 defines a plurality of bolt holes 54 configured to receive the plurality of bolts 41 and includes an edge seal 55 around the edge surface 62 and an inner surface seal (not shown) on the inner surface. The edge seal 55, the inner surface seal, and a crank seal (not shown) proximal to the hub 35 cooperate to prevent engine oil from reaching the flywheel 20.

Industrial Applicability

The flywheel 20 is mounted on the crankshaft 12 in the following manner. The crank gear 14 is mounted on the external portion 21 of the crankshaft 12 such that the plurality of internal splines 34 on the annular inner surface 32 of the crank gear 14 mesh with the plurality of external splines 30 on the annular periphery 24 of the major stub 22 of the external portion 21 of the crankshaft 12. The hub 35 is then mounted on the external portion of the crankshaft 12 such that the plurality of internal splines 50 on the splined portion 44 of the annular inner surface 43 of the hub 35 mesh with the plurality of external splines 30 on the annular periphery 24 of the major stub 22 of the external portion 21 of the crankshaft 12. The retention plate 40 is then inserted into the central opening 71 defined by the hub 35 until the inner surface of the retention plate 40 engages the shoulder 51 of the hub 35. The plurality of bolts 41 are then inserted through the plurality of bolt holes 54 defined by the retention plate 40 and into the plurality of bolt holes 26 defined by the end surface 25 of the major stub 22 of the external portion 21 of the crankshaft 12 and screwed into place. A flywheel housing (not shown) is then mounted on the engine block 11 such that the external portion 21 of the crankshaft 12 and the components mounted thereon are housed by the flywheel housing. The flywheel 20 is then mounted within the flywheel housing on the minor stub 23 of the external portion 21 of the crankshaft 12. A plurality of bolts (not shown) are then inserted through a plurality of bolt holes 72 defined by the flywheel 20 and into the plurality of bolt holes 53 defined by the end surface 52 of the hub 35 and screwed into place. Thus, although the flywheel 20 pilots on the minor stub 23 of the external portion 21 of the crankshaft 12, the flywheel 20 is secured to the hub 35 rather than directly to the crankshaft 12.

Mounting the flywheel on the crankshaft in the above manner provides a number of advantages, including helping to enable a reduction in the diameter of the crankshaft and a reduction in the number of idler gears included in the transmission system, all while maintaining sufficient power to drive the plurality of power takeoff gears. In this way, the cost and space required to implement the transmission system may be reduced.

A transmission system and an associated engine are disclosed herein. Many variations of the disclosed embodiments may be practiced without departing from the scope of the invention, which may only be defined with reference to the following claims.

What is claimed is:

1. A transmission system, comprising:
   a crankshaft having an outer surface with a plurality of splines;
   a hub having an inner surface with a plurality of splines, the hub being mounted on the crankshaft such that the plurality of splines on the inner surface of the hub meshes with the plurality of splines on the outer surface of the crankshaft, wherein the inner surface of the hub includes a splined portion and a substantially smooth portion, the plurality of splines on the inner surface of the hub being oriented in the splined portion and the intersection of the splined portion and the substantially smooth portion forming a shoulder facing away from the crankshaft;
   a retention plate engaging the shoulder and mounted to the crankshaft; and
   a flywheel mounted to the hub.

2. The system of claim 1, wherein the hub includes an end surface facing away from the crankshaft, the end surface defining a plurality of ports for receiving a plurality of bolts that mount the flywheel to the hub.

3. The system of claim 1, further comprising a cam gear.

4. The system of claim 3, further comprising at least one power takeoff gear meshed with the cam gear.

5. A transmission system, comprising:
   a crankshaft having an outer surface with a plurality of splines;
   a crank gear having an inner surface with a plurality of splines, the plurality of splines on the inner surface of the crank gear being meshed with the plurality of splines on the outer surface of the crankshaft;
   a hub having an inner surface with a plurality of splines, the hub being mounted on the crankshaft such that the plurality of splines on the inner surface of the hub meshes with the plurality of splines on the outer surface of the crankshaft, wherein the inner surface of the hub includes a splined portion and a substantially smooth portion, the plurality of splines on the inner surface of the hub being oriented in the splined portion and the intersection of the splined portion and the substantially smooth portion forming a shoulder facing away from the crankshaft;
   a retention plate engaging the shoulder and mounted to the crankshaft; and
   a flywheel mounted to the hub; and
   the hub being oriented between the crank gear and the flywheel.

6. The system of claim 5, wherein the hub includes an end surface facing away from the crankshaft, the end surface defining a plurality of ports for receiving a plurality of bolts that mount the flywheel to the hub.

7. The system of claim 5, further comprising a cam gear meshed with the crank gear.

8. The system of claim 7, further comprising at least one power takeoff gear meshed with the cam gear.

9. An engine, comprising:
   an engine block; and
   a transmission system associated with the engine block and comprising
      a crankshaft having an outer surface with a plurality of splines;
      a crank gear having an inner surface with a plurality of splines, the plurality of splines on the inner surface of the crank gear being meshed with the plurality of splines on the outer surface of the crankshaft;
      a hub having an inner surface with a plurality of splines, the hub being mounted on the crankshaft such that the plurality of splines on the inner surface of the hub meshes with the plurality of splines on the outer surface of the crankshaft, wherein the inner surface of the hub includes a splined portion and a substantially smooth portion, the plurality of splines on the inner surface of the hub being oriented in the splined portion and the intersection of the splined portion and the substantially smooth portion forming a shoulder facing away from the crankshaft;
      a retention plate engaging the shoulder and mounted to the crankshaft; and
      a flywheel mounted to the hub; and
      the hub being oriented between the crank gear and the flywheel.

10. The engine of claim 9, further comprising a cam gear meshed with the crank gear.

11. The engine of claim 10, further comprising at least one power takeoff gear meshed with the cam gear.

\* \* \* \* \*

UNITED STATES PATENT AND TRADEMARK OFFICE
CERTIFICATE OF CORRECTION

| | | |
|---|---|---|
| PATENT NO. | : 8,695,455 B2 | Page 1 of 1 |
| APPLICATION NO. | : 12/973082 | |
| DATED | : April 15, 2014 | |
| INVENTOR(S) | : Petry-Johnson et al. | |

It is certified that error appears in the above-identified patent and that said Letters Patent is hereby corrected as shown below:

In the Specification,

Column 3, line 8, delete "Industrial Applicability" and insert -- INDUSTRIAL APPLICABILITY --.

Signed and Sealed this
Eighth Day of September, 2015

Michelle K. Lee
*Director of the United States Patent and Trademark Office*